United States Patent
Everson et al.

(10) Patent No.: US 11,296,885 B2
(45) Date of Patent: Apr. 5, 2022

(54) SYSTEM AND METHOD FOR IMPLEMENTING CHANNEL DYNAMIC MULTIFACTOR AUTHENTICATION

(71) Applicant: JPMorgan Chase Bank, N.A., New York, NY (US)

(72) Inventors: Eric Everson, Columbus, OH (US); Benjamin R. Cohen, Philadelphia, PA (US); Tim Skeen, New York, NY (US); Kurt A. Baskette, Katy, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 211 days.

(21) Appl. No.: 16/050,710

(22) Filed: Jul. 31, 2018

(65) Prior Publication Data

US 2020/0044851 A1  Feb. 6, 2020

(51) Int. Cl.
*H04L 9/32* (2006.01)
*H04L 29/06* (2006.01)
*G06Q 20/40* (2012.01)

(52) U.S. Cl.
CPC ....... *H04L 9/3228* (2013.01); *G06Q 20/4016* (2013.01); *H04L 9/3215* (2013.01); *H04L 63/0838* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 2005/0097320 A1* | 5/2005 | Golan | G06F 21/40 713/166 |
| 2012/0233665 A1* | 9/2012 | Ranganathan | G06F 21/51 726/4 |
| 2013/0218765 A1* | 8/2013 | Hammad | G06Q 20/4016 705/41 |
| 2015/0026027 A1* | 1/2015 | Priess | G06Q 20/4016 705/35 |
| 2017/0337556 A1* | 11/2017 | Kohli | G06Q 20/40 |
| 2019/0325449 A1* | 10/2019 | Krishnamurthy | G06Q 20/4016 |

* cited by examiner

*Primary Examiner* — Benjamin E Lanier
(74) *Attorney, Agent, or Firm* — Hunton Andrews Kurth LLP

(57) ABSTRACT

An embodiment of the present invention is directed to a Channel Dynamic Multifactor Authentication. This solution provides the capability to select a multifactor authentication channel (e.g., email, SMS, etc.) dynamically based on multiple sources of risk scoring input data. The risk decision engine may determine an optimal lowest risk delivery channel for delivery of a one-time passcode and/or implement an additional or alternative mechanism for user authentication or verification.

20 Claims, 3 Drawing Sheets

US 11,296,885 B2

SYSTEM AND METHOD FOR IMPLEMENTING CHANNEL DYNAMIC MULTIFACTOR AUTHENTICATION

FIELD OF THE INVENTION

The invention relates generally to a system and method for dynamically applying a multifactor authentication channel based on a risk determination.

BACKGROUND OF THE INVENTION

A one-time password, passcode or PIN ("OTP") refers to a code that is valid for a single login session or transaction, on a mobile device, smart device or computer system. Oftentimes, OTPs incorporate a two factor authentication that delivers a password to a device associated with the requesting customer and also requires verification from the customer (e.g., a PIN, password, etc.).

For example, a one-time passcode may be sent to a requesting customer via a particular channel, such as an email or a text message. However, if the customer's email account or phone is compromised, the one-time passcode is also compromised. This type of fraud goes undetected well after the passcode has been provided.

These and other drawbacks currently exist.

SUMMARY OF THE INVENTION

According to one embodiment, the invention relates to a computer implemented system that implements channel dynamic multifactor authentication. The system comprises: a memory that stores and maintains customer profile data comprising customer data, device data and fraud data; and a computer processor, coupled to the memory, programmed to: receive, via an electronic input, a contact from a customer device associated with a customer wherein the contact involves a customer identifier and a request for a one-time passcode; retrieve, using the customer identifier, a customer profile comprising customer data, device data and fraud data; apply, via a risk decision engine, a risk determination based on the customer profile to generate a risk score for the contact; identify an optimal communication channel to transmit the one-time passcode to the customer; and automatically transmit the one-time passcode via the optimal communication channel to the customer.

The system may include a specially programmed computer system comprising one or more computer processors, mobile devices, electronic storage devices, and networks.

The invention also relates to computer implemented method that implements channel dynamic multifactor authentication. The method comprises the steps of: receiving, via an electronic input, a contact from a customer device associated with a customer wherein the contact involves a customer identifier and a request for a one-time passcode; retrieving, using the customer identifier from a memory, a customer profile comprising customer data, device data and fraud data; applying, via a risk decision engine comprising a computer processor, a risk determination based on the customer profile to generate a risk score for the contact; identifying an optimal communication channel to transmit the one-time passcode to the customer; and automatically transmitting the one-time passcode via the optimal communication channel to the customer.

The computer implemented system, method and medium described herein provide unique advantages to financial institutions, banking clients and other entities, according to various embodiments of the invention. An embodiment of the present invention is directed to dynamically determining a secure channel in response to a request for a one-time password or passcode. Rather than a static/single channel multifactor authentication delivery, an embodiment of the present invention is responsive to a one time passcode channel targeted fraud attack that allows the risk decision engine to determine (and/or limit) the appropriate delivery channel dynamically. An embodiment of the present invention provides a secure channel for OTP communication and further addresses the customer in a holistic more complete manner. Other advantages include banking client and customer loyalty and retention due to the improved satisfaction in addressing fraud. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
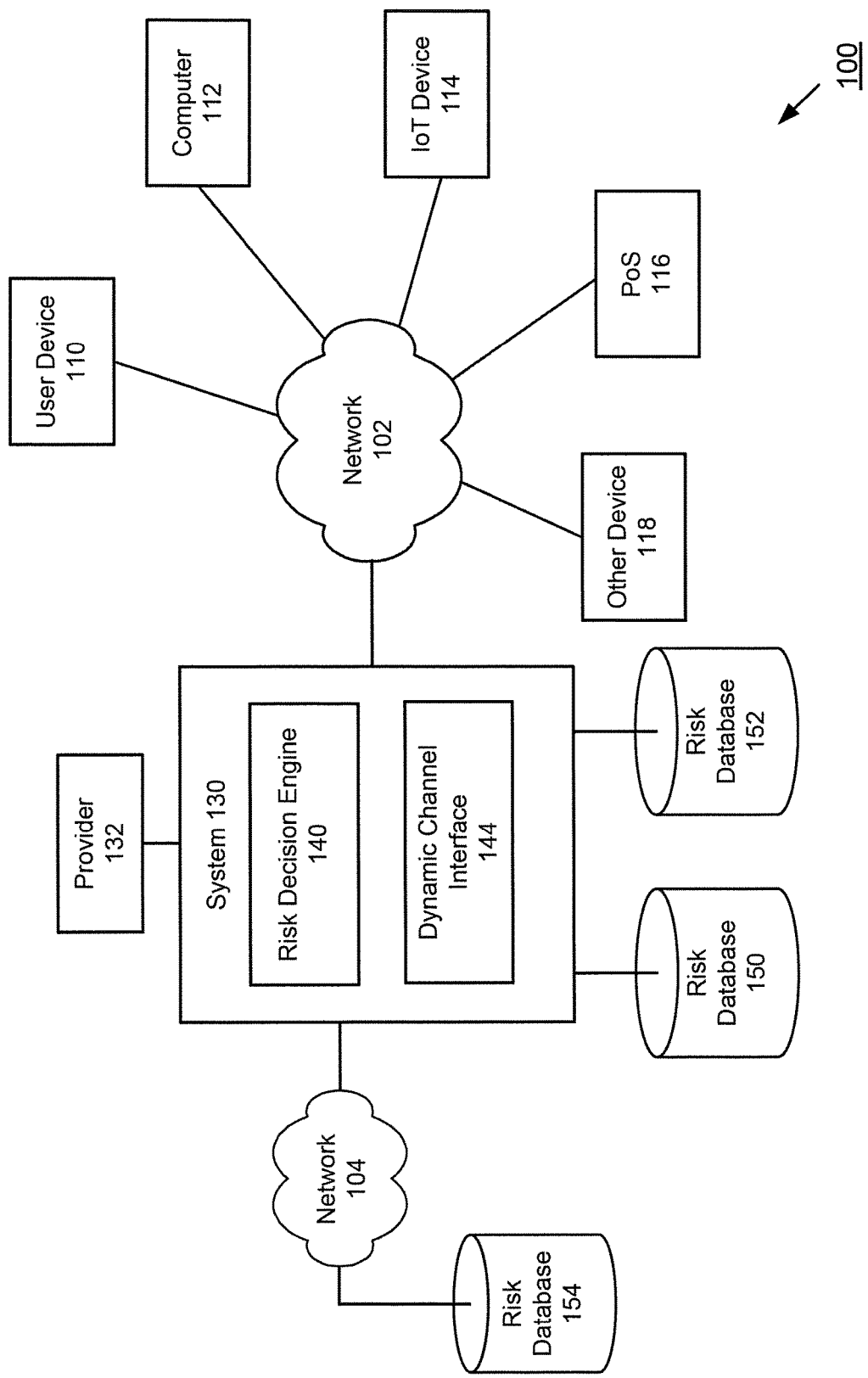
FIG. 1 illustrates a schematic diagram of a system that implements channel dynamic multifactor authentication, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Channel Dynamic Multifactor Authentication. This solution provides the capability to select and apply a multifactor authentication channel (e.g., email, SMS, etc.) dynamically based on multiple sources of risk scoring input data. The risk decision engine may determine an optimal lowest risk delivery channel for delivery of a one-time passcode. Based on a risk determination, the risk decision engine may also implement an additional/alternative mechanism for user authentication or verification.

An embodiment of the present invention is directed to incorporating data from internal as well as external risk data sources to provide an intelligent risk profile that is then used to select an optimal delivery channel. The solution provides a dynamic holistic view of the customer and the customer's current situation. For example, if it is determined that the customer's email account might be compromised, an embodiment of the present invention may select an alternative channel to send the OTP. For high risk requests and/or actions, additional authentication (e.g., biometric, passive authentication, etc.) and/or safeguards may be applied. For example, safeguards may include restrictions on how much the customer can send or spend. Other restrictions may be applied.

An embodiment of the present invention may select an optimal delivery channel from multiple possible channels. Delivery channels may include email communication, text, in-app message, a call center communication and/or other modes of secure communication. For an in-app message, the customer may access an app on the customer's smart device to perform multi-factor authentication to access an OTP. With the call center communication, the system may validate a customer's phone number. This may be performed by a third party, such as a wireless provider, etc. For example, the system may request verification from wireless carriers to validate a name and phone number. In addition, the delivery channels may include multiple contacts for a single customer, such as multiple email addresses, multiple phone numbers for text delivery, etc. For example, if an email provider has been compromised, the system may send the OTP via a different and more secure email provider. The delivery channels may include additional authentications including biometric, IP address verification, voice verification, smart device verification, etc.

An embodiment of the present invention may further support other modes of communication. For example, delivery channels may include communication with smart devices, wearables, virtual assistant applications, IoT devices, etc. Wearables may represent smart electronic devices that can be worn on the person as an accessory. For example, wearables may include activity trackers, watches, glasses, jewelry, etc. Internet of Things (IoT) refers to devices or a network of physical devices, including vehicles, home appliances, speakers, electronics and other items which are enabled to communicate and exchange data. IoT devices are generally embedded with electronics, software and sensors that enable such devices to connect and exchange data.

An embodiment of the present invention is directed to combining customer account information, which may include account changes and customer online profile data, with fraud data which may include known fraud data as well as third-party data. The fraud data may provide detailed analytics and intelligence relating to device scoring. For example, the system may consider fraud activity relevant to a specific device as well as other suspicious activity. The system may also consider fraud data relating to a specific account. For example, the system may detect recent account changes, e.g., address, phone number, etc. The system may also recognize recent and/or repeated failed logins. The fraud data may be compiled into a fraud score or other indicator or metric of fraud severity. For example, a device may considered secure whereas the customer's account, associated with the device, is at a higher risk for fraud. According to another example, the device may be involved in suspicious activity whereas the account is considered low risk.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

FIG. 1 illustrates a schematic diagram of a system that implements channel dynamic multifactor authentication, according to an exemplary embodiment. As illustrated, Network 102 may be communicatively coupled with various user devices, such as User Device 110, Computer 112, IoT Device 114, Point of Sale ("PoS") 116 and/or other devices represented by 118. For example, a customer may request a one-time passcode via a User Device 110, which may include a mobile phone, tablet, wearable, and/or other smart device. The customer may communicate with System 130 via other devices. For example, Computer 112 may represent a laptop and/or other computing device. IoT Device 114 may represent various home network devices, including speakers, home security systems, cameras, appliances, virtual assistant devices, etc. PoS 116 may represent merchant terminals, kiosks, interactive stations as well as ATM devices. Other devices with communication features are represented by 118. System 130 may perform a risk determination and implement an optimal channel to communicate the request one-time passcode to the requesting customer. The mode of communication may be provided via various channels, including email communication, text message, in-app message, call center, etc.

System 130 may include a Risk Decision Engine 140 and a Dynamic Channel Interface 144. Risk Decision Engine 140 may apply a risk algorithm to generate a risk determination based on various factors, including device data, account data and fraud data for a given customer contact or request. Dynamic Channel Interface 144 may apply an optimal communication channel for the OTP based on the risk determination made by Risk Decision Engine 140. The optimal communication channel may be used to communicate an OTP as well as perform additional authentication and/or verification for high risk requests and/or actions.

Risk Database 150 may store and maintain device data, account data and other fraud related data from customers, past fraud events, and/or other various sources of fraud and other related data. For example, Risk Database 150 may include IP address, geolocation, device data, etc. Risk Database 150 may also maintain client data, including client behavior, trends, known good behavior, known good indicators, good beneficiaries, etc. Risk Database 150 may store and maintain fraud characteristics and data from known fraud events, for example. Risk Database 150 may store data relating to fraud event, target (e.g., person/group/team targeted), amount (e.g., currency, threshold amounts, etc.), type of request (e.g., wire transfer), type of target (e.g., communication channel, email, etc.) and/or other characteristic or factor. Risk Database 150 may also identify known bad and known good fraud indicators, including bad/good beneficiaries, bad/good accounts, etc. Risk Database 150 may also store and maintain analytics, reports, trends and/or other data, etc. Risk Database 150 may be an internal database as well as an external database, represented by 154 that may be accessed via Network 104. Risk Database 150 may be further combined as well as distributed via various storage devices, represented by Risk Databases 152, 154. Other database architectures may be applied. The channel dynamic multifactor authentication functionality described herein may be provided by System 130 and/or a third party provider, represented by 132, where Provider 132 may operate with a Financial Entity, for example.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Network 102, 104 may be a wireless network, a wired network or any combination of wireless network and wired network. For example, Network 102, 104 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102, 104 may support an Internet network, a wireless communication network, a cellular network, Bluetooth, or the like, or any combination thereof. Network 102, 104 may further include one, or any number of the exemplary types of networks mentioned above operating as a stand-alone network or in cooperation with each other. Network 102, 104 may utilize one or more protocols of one or more network elements to which it is communicatively coupled. Network 102, 104 may translate to or from other protocols to one or more protocols of network devices. Although Network 102, 104 is depicted as one network for simplicity, it should be appreciated that according to one or more embodiments, Network 102, 104 may comprise a plurality of interconnected networks, such as, for example, a service provider network, the Internet, a cellular network, corporate networks, or even home networks, or any of the types of networks mentioned above.

Data may be transmitted and received via Network 102, 104 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. System 130 may communicate with various entities, via Dynamic Channel Interface 144, using any mobile or computing device, such as a laptop computer, a personal digital assistant, a smartphone, a smartwatch, smart glasses, other wearables or other computing devices capable of sending or receiving network signals. Dynamic Channel Interface 144 may represent a user interface and/or other interactive communication portal.

System 130 may be communicatively coupled to Databases 150, 152, 154. Databases 150, 152, 154 may include any suitable data structure to maintain the information and allow access and retrieval of the information. For example, Databases 150, 152, 154 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases 150, 152, 154 may be any suitable storage device or devices. The storage may be local, remote, or a combination thereof with respect to Databases 150, 152, 154. Databases 150, 152, 154 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases 150, 152, 154 may have back-up capability built-in. Communications with Databases 150, 152, 154 may be over a network, or communications may involve a direct connection between Databases 150, 152, 154 and System 130, as depicted in FIG. 1. Databases 150, 152, 154 may also represent cloud or other network based storage.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 2:
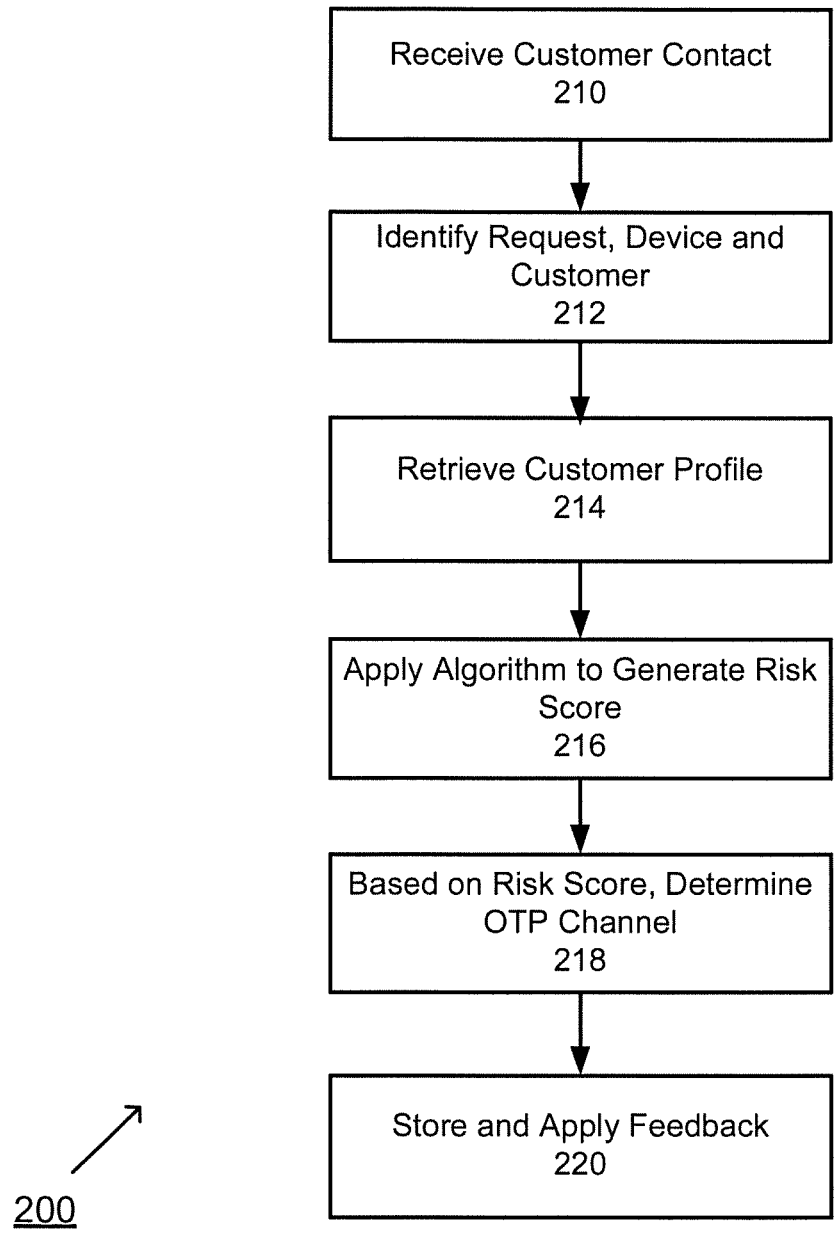
FIG. 2 is an exemplary flowchart that illustrates a method for channel dynamic multifactor authentication, according to an embodiment of the present invention.

FIG. 2 is an exemplary flowchart that illustrates a method for channel dynamic multifactor authentication, according to an embodiment of the present invention. At step 210, a customer contact may be received. At step 212, based on the customer contact, a corresponding device and customer identifier may be identified. At step 214, a corresponding customer profile may be retrieved. At step 216, an algorithm may be applied to generate a risk score. At step 218, based on the risk score, an optimal channel may be determined. At step 220, the system may store and apply feedback analysis for further refinement. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a customer contact may be received. The customer may request information and/or an action. In response to the request, the system may send a OTP to the customer for security and authentication. The request may involve a financial transaction, credit or debit card activity and/or access to customer sensitive data. For example, the request may involve a request to add a new card to an electronic wallet application on the customer's smart phone. According to another example, the request may include a high risk activity, such as sending a high dollar amount wire to an unknown entity. Other potentially risky requests and contacts may be received by the system.

At step 212, based on the customer contact, a corresponding device and customer identifier may be identified. For example, the customer may make the request from a mobile phone. In addition, based on the customer identifier, the system may identify one or more additional devices and other customer information, which may include additional smart devices, IoT devices, email addresses, phone numbers, etc.

At step 214, a customer profile may be retrieved. The customer profile may include customer account information. This may include recent changes as well as past historical changes and trend data.

At step 216, an algorithm may be applied to generate a risk score for the customer contact. The algorithm may be applied to customer data, device data as well as fraud risk data, which may include cyber fraud indicators as well as biometric analysis. Cyber fraud indicators may include IP address, financial malware indicators, phone numbers associated with a known bad ANI, etc.

According to an embodiment of the present invention, the risk score may be based on various metrics and data, including device data, account data, fraud data and other customer related data. For example, device data may include data relating to known fraud device; device type or name; device location (this may include historical location and current location); device phone number and number of registered devices. Account data may include account open date, related account data (other accounts associated with the customer or related accounts, such as household accounts); and recent and historical changes to an account (e.g., change of contact information; frequency of use; outlier purchases; etc.). Fraud data may include product velocity; fraud/suspicious account history; recent OTP channel changes; failed login history; and other external risk data. Other data may include cyber indicators in rendering a risk determination. For example, an embodiment of the present invention may consider an IP address that a customer request is initiating from. The system may also observe whether the client is exhibiting a signature that is indicative of suspicious and/or fraudulent behavior. Other risk data may include global data. For example, global risk data may indicate that a geographic region, such as a foreign country, is experiencing an usually high rate of fraud. This data may result in a higher risk score for customer contacts originated from this region.

An embodiment of the present invention may apply varying weights to certain data. For example, the system may apply a higher weight to transactions above a certain threshold amount. Other variations may be applied.

Based on a combination of these and other factors, an embodiment of the present invention may then dynamically generate a risk score. For example, the risk score may be a numeric representation on a scale. The scale may be numeric or other scale (e.g., scale of 1 to 5, 1 to 10, 1 to 100, 1 to 1000, etc.) where a high number represents high risk and a low number represents a low risk. Other variations may be applied.

At step 218, based on the risk score, an optimal or appropriate channel may be identified. If the risk score indicates a low risk, a default communication may be used, such as an email communication. If the risk score indicates a high risk, specifically for the email account, the system may apply a different and more secure channel, such as an in-app communication or a call center where the requesting customer's voice or other biometric may be authenticated.

According to another example, if the request is made at a terminal or during an in-person interaction, the system may request verification, such as a fingerprint, biometric, facial recognition, etc. In this example, the customer authentication may be provided via a terminal, PoS, ATM device, teller station, kiosk, etc. If the customer is at home or near a verified smart device, the customer may be requested to provide verification via the smart device. For example, a customer may be at home near a voice initiated assistant. In this scenario, the customer's voice may be used for authentication. In addition, the system may convey a OTP through the voice initiated assistant. The voice initiated assistant may voice the OTP or communicate the OTP via near field or other proximity based communication. Other smart devices, such as speakers, home security keypad, home security camera, appliance and/or other interactive devices and panels may be used as a communication channel.

According to an embodiment of the present invention, the system may apply additional authentications and/or apply a combination of multiple channels. For example, the system may provide implement different channels (and authentication options) based on the varying degree of risk indicated by the risk score. For a high risk contact, additional authentications may be applied. For example, the system may request a customer input as well as perform additional passive authentications that do not require a customer's affirmative response or input. In this example, the system may verify an IP address, verify customer location, smart device interaction pattern and other types of passive verification. Other variations may be applied.

At step 220, the system may store and apply feedback analysis for further refinement. The system may continue to refine the process by examining and analyzing known fraud as well as known good transactions. The feedback analysis may also focus on client behavior information so that the system may better understand and predict a client's payment and transaction behavior.

Figure 3:
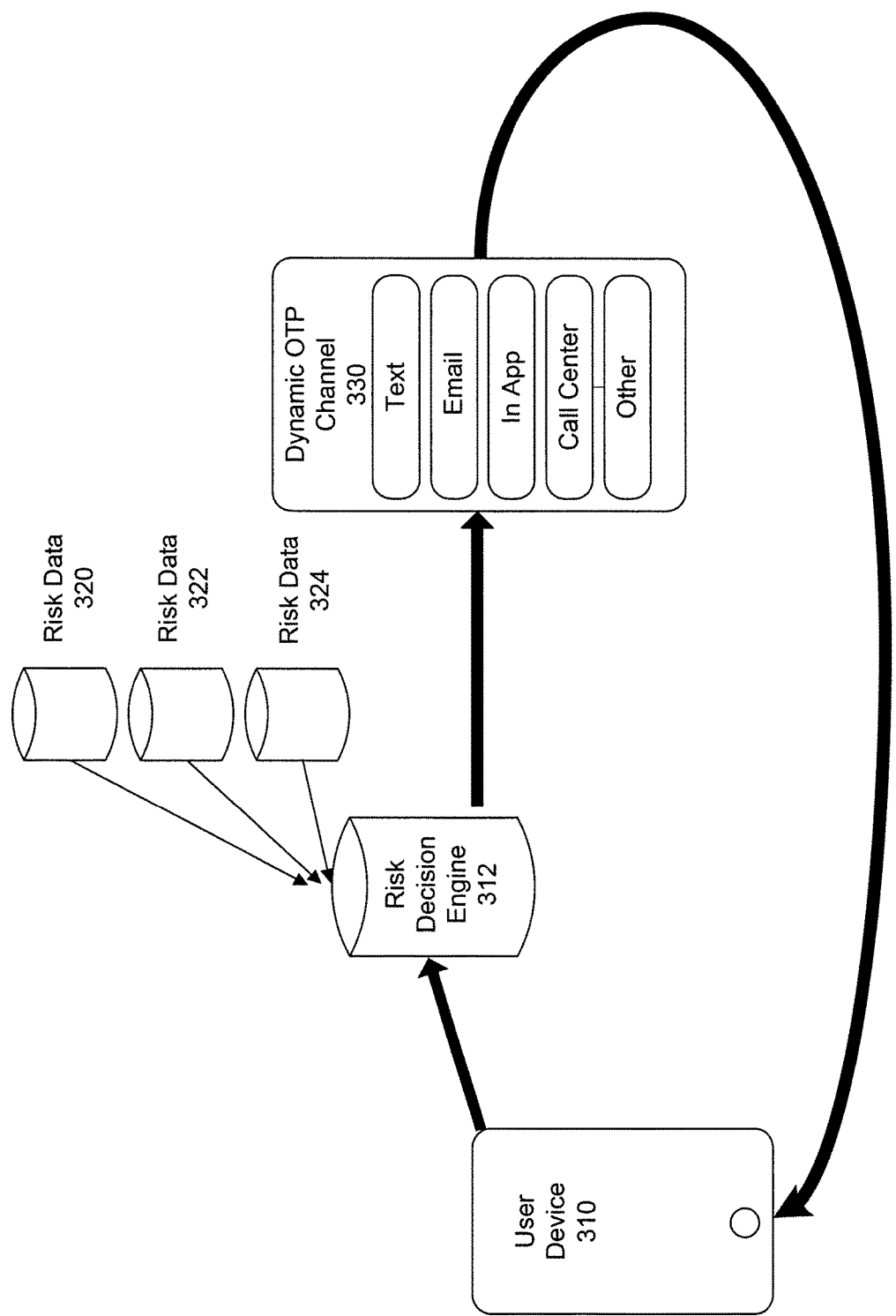
FIG. 3 represents an exemplary flow diagram that applies a channel dynamic multifactor authentication, according to an embodiment of the present invention.

FIG. 3 represents an exemplary flow diagram that applies a channel dynamic multifactor authentication, according to an embodiment of the present invention. User Device 310 may make a request for a OTP. For example, the request may involve an action, such as adding a new card to an electronic wallet application, transferring money and/or other financial or sensitive action that may pose a risk. The request may be received by Risk Decision Engine 312, which may access Risk Data from various sources represented by 320, 322 and 324. Risk Decision Engine 312 may make a risk determination. Based on the risk determination, Dynamic OTP Channel 330 may select an optimal channel to convey the OTP back to the user. In addition, the optimal channel may be used to perform additional authentication. Based on the level of risk, other forms of authentication may be implemented.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript, etc. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements channel dynamic multifactor authentication, the system comprising:
    a memory that stores and maintains customer profile data comprising customer data, device data and fraud data; and
    a computer processor, coupled to the memory, programmed to:
    receive, via an electronic input, a contact from a customer device associated with a customer wherein the contact involves a customer identifier and a request for a one-time passcode;

retrieve, using the customer identifier, a customer profile comprising customer data, device data, and fraud data; wherein the fraud data includes information relating to a risk assessment of at least two of a plurality of communication channels, wherein the at least two of a plurality of communication channels comprise electronic communication channels;

apply, via a risk decision engine, a risk determination based on the customer profile to generate a risk score for the contact;

determine an optimal communication channel from the plurality of communication channels to transmit the one-time passcode to the customer based on the risk score and the information relating to the risk assessment of the at least two of the plurality of communication channels from the fraud data, wherein the optimal communication channel determined varies depending on a magnitude of the risk score such that a default communication channel is selected for a low risk score and a channel having higher security than the default communication channel is selected for a high risk score;

request verification from the customer based on a location of the contact such that when the contact originates from a terminal the verification requested comprises one of a fingerprint, biometric, or facial recognition through the terminal, wherein the terminal comprises one of a point of sale device, an automated teller machine, a teller station, or a kiosk, and when the contact originates from a home, or proximate a verified smart device, the verification requested comprises voice verification through the verified smart device wherein the verified smart device comprises one of a voice initiated assistant, speaker, home security keypad, home security camera, or an appliance;

automatically transmit the one-time passcode via the optimal communication channel to the customer.

2. The system of claim 1, wherein the contact from the customer device comprises a request to add a credit card to an electronic wallet application executing on the customer's device.

3. The system of claim 1, wherein the contact from the customer device comprises a financial transaction.

4. The system of claim 1, wherein the optimal communication channel comprises an in-app communication to the customer's device.

5. The system of claim 1, wherein the optimal communication channel comprises a call center communication.

6. The system of claim 1, wherein the optimal communication channel comprises a smart device associated with the customer, and the one-time passcode is transmitted through a voice-initiated assistant on the smart device.

7. The system of claim 1, wherein the computer processor is further programmed to:
responsive to the risk score, identify and apply an additional authentication prior to transmitting the one-time passcode.

8. The system of claim 1, wherein the risk determination is based on device data, account data and fraud data.

9. The system of claim 8, wherein the device data comprises known fraud activity on the device, device type and device location.

10. The system of claim 8, wherein the fraud data comprises account change data and failed login history.

11. A method that implements channel dynamic multifactor authentication, the method comprising the steps of:

receiving, via an electronic input, a contact from a customer device associated with a customer wherein the contact involves a customer identifier and a request for a one-time passcode;

retrieving, using the customer identifier from a memory, a customer profile comprising customer data, device data and fraud data; wherein the fraud data includes information relating to a risk assessment of at least two of a plurality of communication channels, wherein the at least two of a plurality of communication channels comprise electronic communication channels;

applying, via a risk decision engine comprising a computer processor, a risk determination based on the customer profile to generate a risk score for the contact;

determining an optimal communication channel from a plurality of communication channels to transmit the one-time passcode to the customer based on the risk score and the information relating to the risk assessment of the at least two of the plurality of communication channels from the fraud data, wherein the optimal communication channel determined varies depending on a magnitude of the risk score such that a default communication channel is selected for a low risk score and a channel having higher security than the default communication channel is selected for a high risk score;

requesting verification from the customer based on a location of the contact such that when the contact originates from a terminal the verification requested comprises one of a fingerprint, biometric, or facial recognition through the terminal, wherein the terminal comprises one of a point of sale device, an automated teller machine, a teller station, or a kiosk, and when the contact originates from a home or proximate a verified smart device, the verification requested comprises voice verification wherein the verified smart device comprises one of a voice initiated assistant, speaker, home security keypad, home security camera, or an appliance;

automatically transmitting the one-time passcode via the optimal communication channel to the customer.

12. The method of claim 11, wherein the contact from the customer device comprises a request to add a credit card to an electronic wallet application executing on the customer's device.

13. The method of claim 11, wherein the contact from the customer device comprises a financial transaction.

14. The method of claim 11, wherein the optimal communication channel comprises an in-app communication to the customer's device.

15. The method of claim 11, wherein the optimal communication channel comprises a call center communication.

16. The method of claim 11, wherein the optimal communication channel comprises a smart device associated with the customer, and the one-time passcode is transmitted through a voice-initiated assistant on the smart device.

17. The method of claim 11, further comprising the steps of:
responsive to the risk score, identifying and applying an additional authentication prior to transmitting the one-time passcode.

18. The method of claim 11, wherein the risk determination is based on device data, account data and fraud data.

19. The method of claim 18, wherein the device data comprises known fraud activity on the device, device type and device location.

20. The method of claim 11, wherein the fraud data comprises account change data and failed login history.

* * * * *